(12) United States Patent
Huang et al.

(10) Patent No.: US 8,085,349 B2
(45) Date of Patent: Dec. 27, 2011

(54) DIGITAL PHOTO FRAME WITH INTERCHANGEABLE FRONT FRAME

(75) Inventors: Wen-Hung Huang, Taipei County (TW); Guan-De Liou, Taipei (TW); Stephen Tsai, Taipei County (TW)

(73) Assignee: Hannspree, Inc., Taipei (TW)

( * ) Notice: Subject to any disclaimer, the term of this patent is extended or adjusted under 35 U.S.C. 154(b) by 479 days.

(21) Appl. No.: 12/319,076

(22) Filed: Dec. 30, 2008

(65) Prior Publication Data

US 2010/0026913 A1 Feb. 4, 2010

(30) Foreign Application Priority Data

Jul. 30, 2008 (TW) .............................. 97128901 A

(51) Int. Cl.
*H04N 7/00* (2006.01)
(52) U.S. Cl. ............. 348/836; 348/739; 40/784; 40/790
(58) Field of Classification Search .............. 40/790, 40/792, 796, 757, 747; 345/87, 76, 82, 204; 348/836
See application file for complete search history.

(56) References Cited

U.S. PATENT DOCUMENTS

| | | | | |
|---|---|---|---|---|
| 1,407,177 A * | 2/1922 | Stone | | 40/757 |
| 1,959,745 A * | 5/1934 | Stout | | 248/489 |
| 1,982,143 A * | 11/1934 | Schill | | 40/784 |
| 2,820,311 A * | 1/1958 | Hamlin | | 40/790 |
| 4,805,325 A * | 2/1989 | Cassard | | 40/759 |
| 6,668,576 B1 * | 12/2003 | Etlender | | 62/330 |
| 6,826,863 B1 * | 12/2004 | Goodfellow | | 40/725 |
| 7,441,361 B2 * | 10/2008 | Rowan | | 40/743 |
| 7,940,518 B2 * | 5/2011 | Finnegan | | 361/679.21 |
| 2007/0181771 A1 * | 8/2007 | Alcov | | 248/466 |

FOREIGN PATENT DOCUMENTS

| | | |
|---|---|---|
| CN | 2194275 Y | 4/1995 |
| CN | 2236794 | 10/1996 |
| CN | 2403298 Y | 11/2000 |
| CN | 2749384 Y | 1/2006 |
| CN | 2815152 Y | 9/2006 |

* cited by examiner

*Primary Examiner* — Brian Glessner
*Assistant Examiner* — Adam Barlow
(74) *Attorney, Agent, or Firm* — Haverstock & Owens LLP

(57) ABSTRACT

The present invention relates to a digital photo frame including: a control module; a display panel electrically connected to the control module and displaying an image; a first front frame having a first and a second surfaces; and a plurality of swing fasteners mounted on the second surface. Each of the swing fasteners is composed of a first arm and a pivot connecting thereto. The first arm pushes against the display panel when the display panel is attached to the front frame. At least one of the swing fasteners has a second arm and a hollow portion thereon, and the digital photo frame is hung on a support by the hollow portion. The design of swing fastener makes the interchangeability of different front frames possible, and the replaced front frame can be wedged in another size-suitable display panel or form a traditional photo frame with a photograph and a rear board.

12 Claims, 7 Drawing Sheets

DIGITAL PHOTO FRAME WITH INTERCHANGEABLE FRONT FRAME

FIELD OF THE INVENTION

The present invention relates to a digital photo frame. In particular, the present invention relates to a digital photo frame with an interchangeable front frame which can be hung on the wall by a hollow portion on a second arm of a swing fastener.

BACKGROUND OF THE INVENTION

Since cameras were invented, photographs not only record images, but also enrich human beings' lives. In the past, individuals must developed the films or printed the photographs on the papers to view the photographs. In addition, individuals also put the photographs into the photo frame to view the photos at any moment. Please refer to FIGS. 1(A) and 1(B), which respectively are a perspective view and a rear view of a traditional photo frame. In FIG. 1(A), a photograph 13 is disposed at one side of a transparent member 12 of the photo frame body 11, and a rear board 14 with a support 15 then is disposed in the rear side of the photograph 13. Please refer to FIG. 1(B), a plurality of swing fasteners 16, 17, 18 are rotatable and attached to the photo frame body 11, to locate the photograph 13 in the photo frame 10 between the transparent member 12 and rear board 14. Further, the photo frame 10 can be position on a surface or table by adjusting the angle between the support 15 and the rear board 14.

Along with the progress of technology, more and more digital cameras are been development and used. Digital photos are becoming more common and can be shown on the screen, and the digital photo frame integrating the liquid crystal display (LCD) with the digital photos can achieve the functions of displaying and viewing photographs on the LCD. In general, the digital photo frame can replace the displays of digital photos instantaneously according to the setting. However, the front frames of these digital photo frames cannot be replaced and the appearance of the digital photo frames cannot satisfy the modern people. Even the front frame can be replaced, the replaced front frame is useless since the replaced front frame is departed from the body of the digital photo frame.

Therefore, if the digital photo frame with an interchangeable front frame can be invented and the swing fasteners of the front frame can be improved, the user can replace the different front frames of the digital photo frame, and the replaced front frame further can be fabricated with the rear board of the photo frame to form a new photo frame for displaying the photos. Further, because of the design of swing fasteners, the digital photo frame not only can stand on the table, but also can be hung on the wall or any suspended object.

SUMMARY OF THE INVENTION

For overcoming the drawbacks of the traditional digital photo frame unable to replace the front frame and/or the replaced front frame are useless without a control module, the digital photo frame with an interchangeable front frame of the present invention achieves the advantages of wall hanging and angles adjustment, so as to overcome the above-mentioned defects by the designs of the hollow portion on the second arm of the swing fastener. The replaced front frame can further be turn into a ordinary photo frame by attaching a rear board with the swing fasteners.

In accordance with one aspect of the present invention, a digital photo frame is provided. The digital photo frame includes: a control module; a display panel electrically connected to the control module and displaying an image; a first front frame having a first surface and a second surface; and a plurality of swing fasteners mounted on the second surface, each of which has a pivot and a first arm connected to the pivot. The first arm pushes against the display panel when the display panel is attached to the front frame.

Preferably, at least one of the swing fasteners has a second arm having a hollow portion thereon and connected to the pivot, and the digital photo frame is hanged on a support by the hollow portion.

Preferably, the first arm and the second arm have an included angle range between 0 degree and 180 degrees.

Preferably, the second arm is used for adjusting a position of the digital photo frame on a support.

Preferably, the hollow portion is replaced by an aperture, and the aperture has a semicircular shape.

Preferably, the digital photo frame further includes a rear board so as to be pushes against the photograph by the first arm to hold a photograph between the first surface and the rear board.

Preferably, the plurality of swing fasteners are arranged in a triangular shape on the second surface and has a total number of three.

Preferably, the plurality of swing fasteners are arranged in a polygonal shape on the second surface and has a total number of more than three.

Preferably, the first front frame is made of a material being one selected from a group consisting of a ceramic, a metal, a plastic, a wood and a combination thereof.

Preferably, the control module is used for controlling the display panel, and the display panel contacts with the first surface.

In accordance with another aspect of the present invention, a digital photo frame is provided. The digital photo frame has a front frame having at least one swing fastener set mounted thereon and a display panel. The swing fastener set further includes: a first swing fastener having a first pivot and a first arm connected to the first pivot for pushing against the display panel; and a second swing fastener having a second pivot and a second arm having an aperture thereon and connected to the second pivot. The digital photo frame is hanged on a support by the aperture.

In accordance with another aspect of the present invention, a digital photo frame is provided. The digital photo frame has a front frame, a display panel and at least one swing fastener mounted on the front frame. The at least one swing fastener further includes: a first arm pushing against the display panel; a second arm having an aperture; and a pivot connecting the first arm and the second arm. The digital photo frame is hanged on a support by the aperture.

Preferably, the second arm includes a first part, a second part connected to the pivot and an extendable link connecting the first part and the second part, and the second arm is extended by the extendable link.

Preferably, the extendable link is a slide rail system.

Preferably, the slide rail system includes a rail and a sliding part sliding along the rail, and the sliding part is one of a slice and a pair of rods.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 2A:
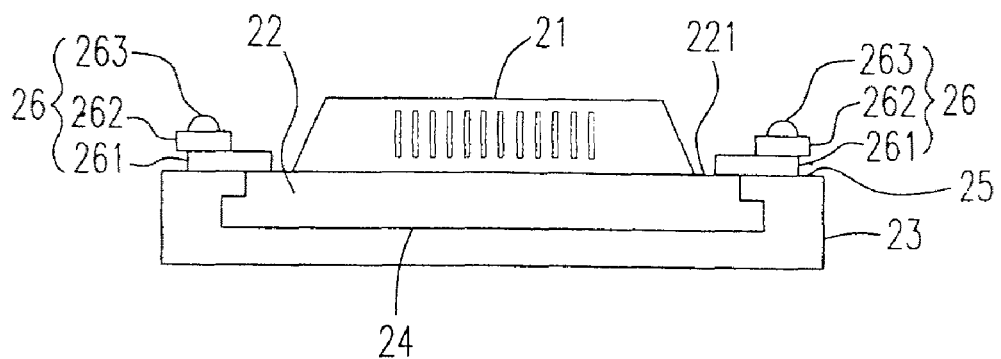
FIGS. 2(A) and 2(B) are a top view and a rear view respectively of a digital photo frame in accordance with a first preferred embodiment in the present invention.
Figure 2B:
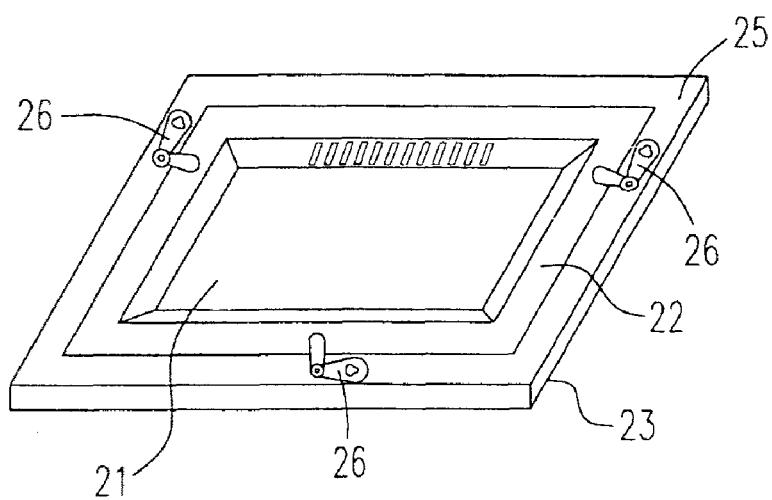

Please refer to FIGS. 2(A) and 2(B), which are a top view and a rear view respectively of a digital photo frame of the first preferred embodiment in the present invention. In FIG. 2(A), a digital photo frame 20 is composed of a control module 21, a display panel 22 and a front frame 23. The interior of the control module 21 includes electronic components, such as control unit, storage device, circuit board, and etc., for controlling the digital photo frame 20. The display panel 22 is electrically connected to the control module 21 for displaying the electronic images and further switching the electronic images. The front frame 23 has a first surface 24 and a second surface 25, wherein the first surface 24 is attached into the display panel 22 and a plurality of swing fasteners 26 are mounted on the second surface 25. The material of the front frame 23 can be ceramics, metals, plastic materials, wood or the combination thereof. In FIG. 2(B), each swing fastener 26 is disposed on the varied positions of the second surface 25 of the front frame 23. When the number of the swing fastener 26 is three or more than three, the swing fasteners 26 are arranged in a triangular shape or a polygonal shape on the second surface 25.

Figure 3C:
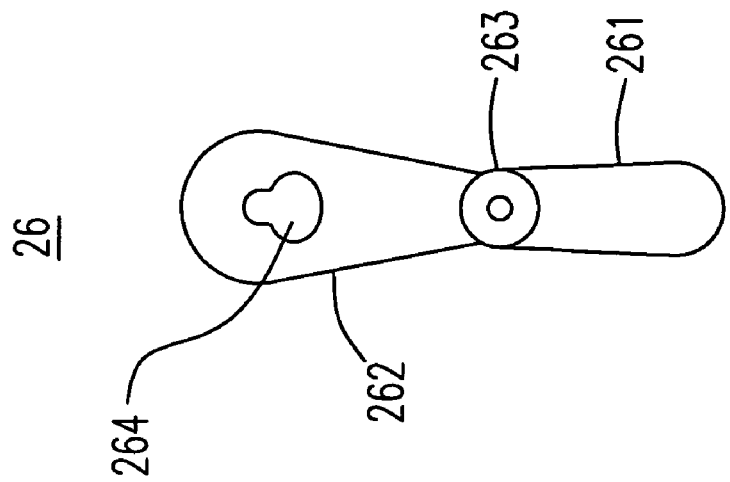
FIGS. 3(A) to 3(C) are the structural diagrams showing the swing fasteners in accordance with the first preferred embodiment of the present invention.
Figure 3B:
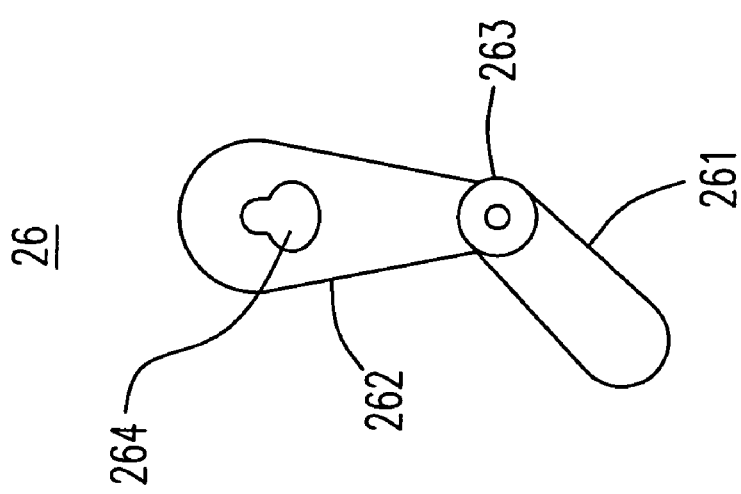
Figure 3A:
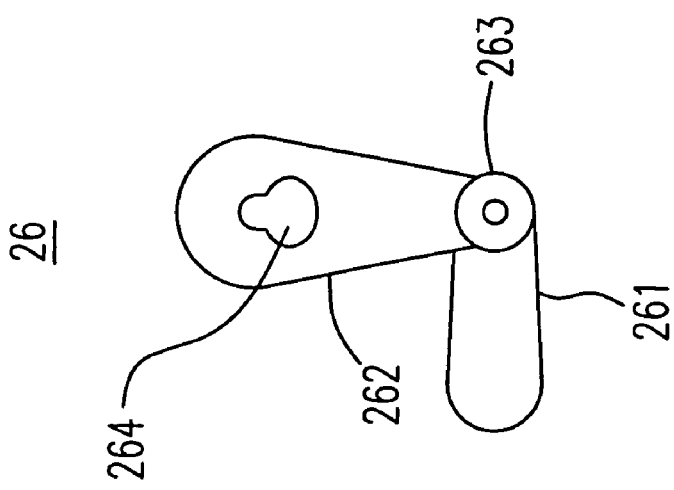

Please refer to FIGS. 3(A) to 3(C), which are the structural diagrams showing the swing fasteners in the first preferred embodiment of the present invention. The swing fastener 26 has a first arm 261, a second arm 262 and a pivot 263 connected with the first arm 261 and the second arm 262. The pivot 263 is mounted on the second surface 25 of the front frame 23 (FIG. 2(A)). The first arm 261 and the second arm 262 are rotated by the pivot 263 as the axis. When the front frame 23 is attached to the display panel 22, the first arm 261 is rotated to wedge in the display panel 22. A hollow portion 264 is disposed on the second arm 262 of the swing fastener 26. When the first arm 261 is attached to the display panel 22, the position and the angle of the second arm 262 are adjusted so as to aim the hollow portion 264 to hang on the wall and accomplish the hanging of the digital photo frame 20.

The included angle between the first arm 261 and the second arm 262 of the swing fastener 26 can be adjusted on demand, and the included angle range from 0 degree to 180 degrees. As the swing fasteners of the first preferred embodiment shown in FIGS. 3(A), 3(B) and 3(C), the included angles can be 90, 135 and 180 degrees respectively.

Figure 4:
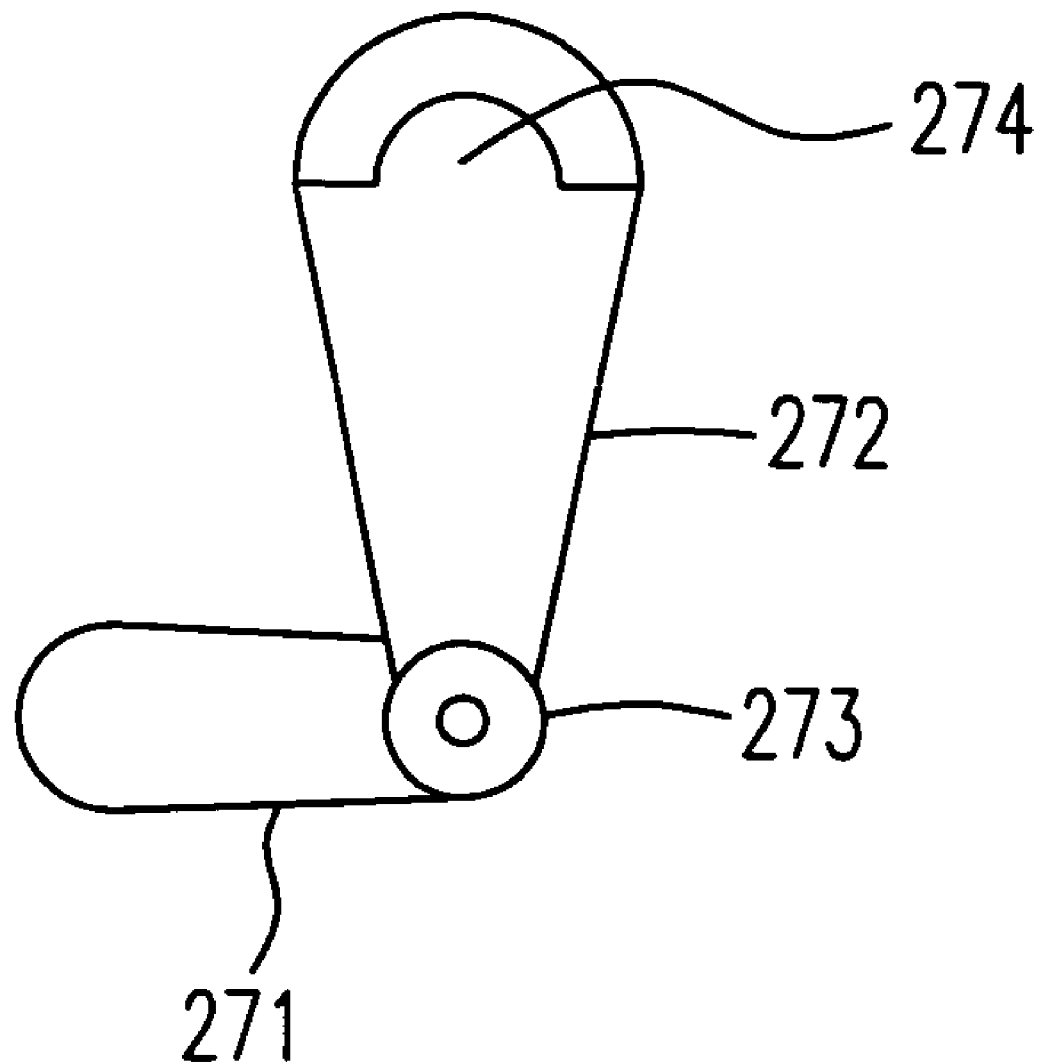
FIG. 4 is a structural diagram showing a swing fastener in accordance with a second preferred embodiment of the present invention.

The hollow portion 264 on the swing fastener 26 can be designed as any shape which can be hung on a nail or a hook. Please refer to FIG. 4, which is a structural diagram showing a swing fastener in a second preferred embodiment of the present invention. In FIG. 4, the swing fastener 27 also has a first arm 271, a second arm 272, an pivot 273 and an aperture 274. The aperture 274 is designed as a semicircular shape.

In addition, the aperture 274 on the swing fastener 27 also can be designed as a loop passing through the second arm 272 of the swing fastener 27, for hooking on the nail or tying a rope thereon (not shown). When one end of the rope passes through the loop and ties at the second arm of the swing fastener, another end of the rope can be fixed on the fixture. Alternatively, two ends of the rope pass through the respective loops of two swing fasteners and tie at the second arms thereof, and the digital photo frame is hanged on the wall or the fixture.

Figure 5C:
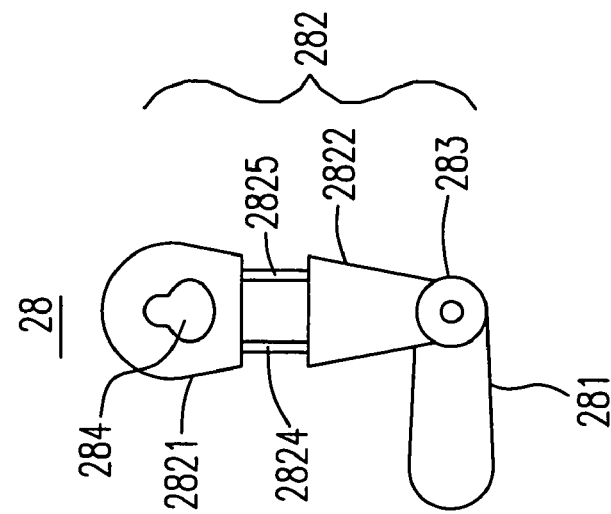
FIGS. 5(A) to 5(C) are the structural diagrams showing the swing fastener in accordance with a third preferred embodiment of the present invention.
Figure 5B:
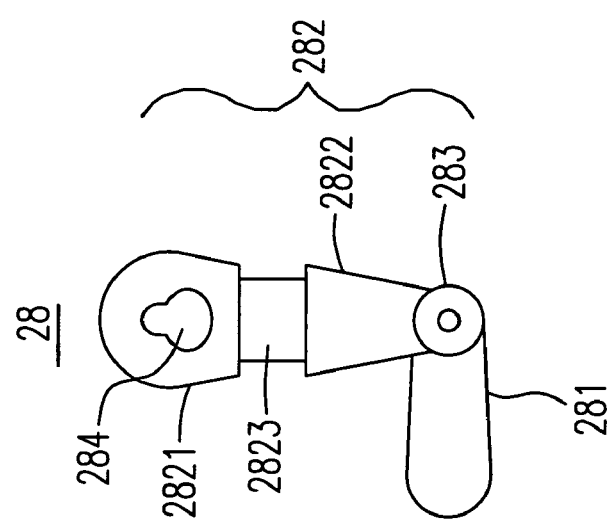
Figure 5A:
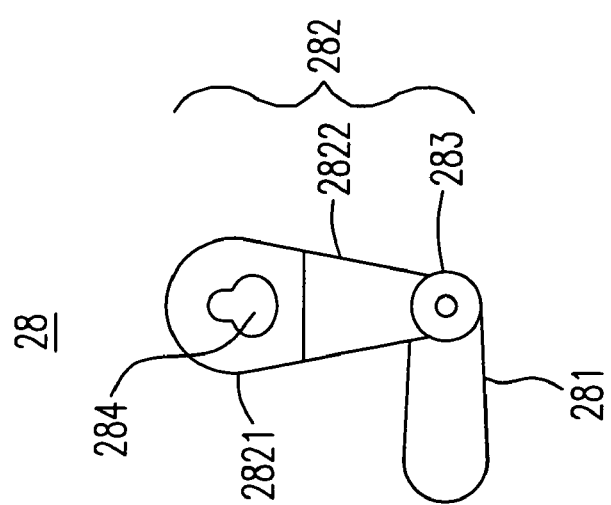

The second arm of the swing fastener further can be designed as the extendable second arm. Please refer to FIGS. 5(A) to 5(C), which are the structural diagram showing swing fasteners in accordance with a third preferred embodiment of the present invention. In FIG. 5(A), the swing fastener 28 has a first arm 281, a second arm 282 and a pivot 283, wherein the second arm 282 is composed of a first part 2821 and a second part 2822, and the second part 2822 is connected with the pivot 283. The first part 2821 at least has a link which is connected with at least a rail (not shown) corresponded to the second part 2822 for extending the length of the second arm. The link 2823 in FIG. 5(B) is designed as a sliding plate, and the links 2824 and 2825 in FIG. 5(C) are designed as two sliding rods. The advantage of the link of the swing fastener 28 lies in that the length of the second arm 282 can be adjusted, for verifying the hanging position and the angle of the digital photo frame.

Figure 6:
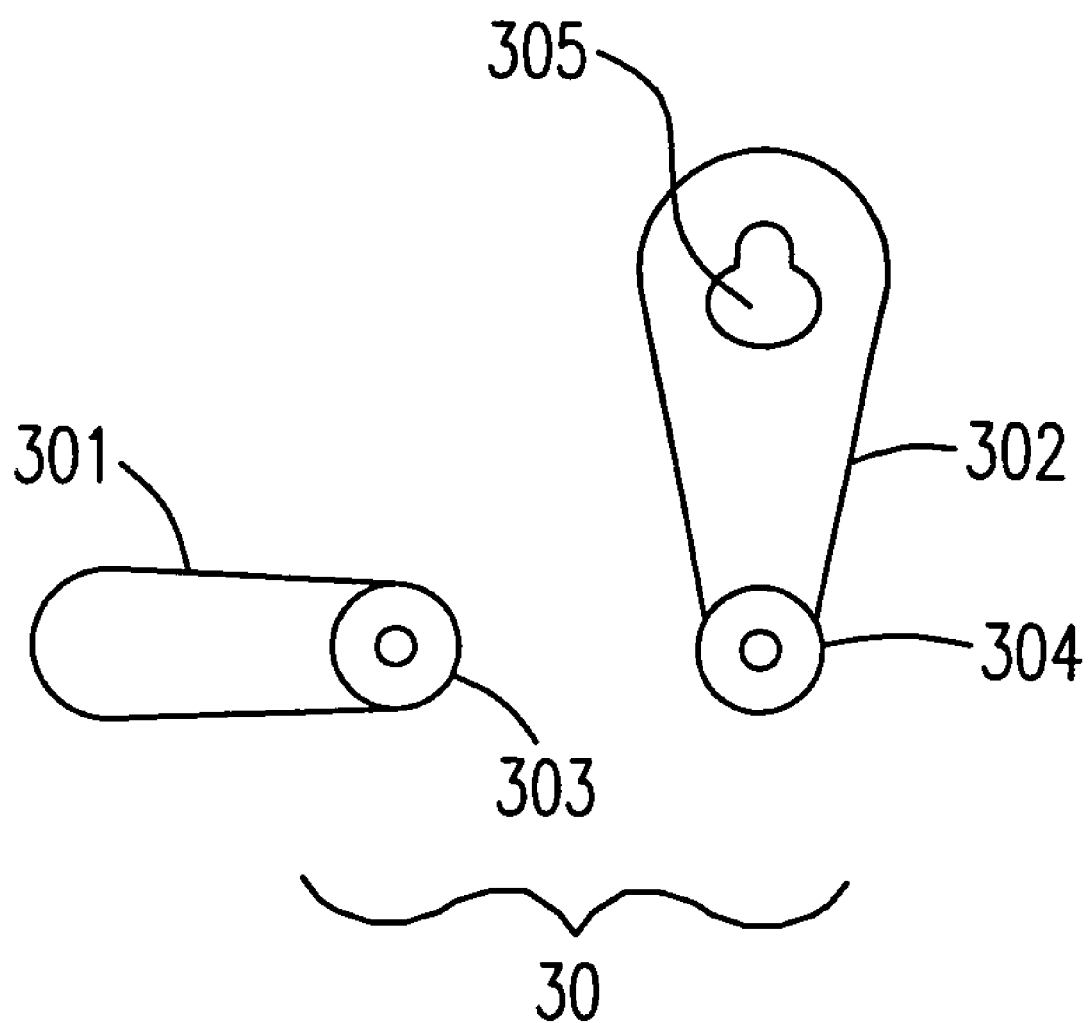
FIG. 6 is the structural diagram showing a swing fastener set of the present invention.

In the present invention, the swing fastener further can be designed as the swing fastener set. Please refer to FIG. 6, which is the structural diagram showing a swing fastener set of the present invention. In FIG. 6, the swing fastener set 30 includes a first swing fastener having a first arm 301 and a first pivot 303 connected to the first arm 301; and a second swing fastener having a second arm 302 and a second pivot 304 connected to the second arm 302. The first arm 301 is attached to the display panel of the digital photo frame. The first swing fastener and the second swing fastener are disposed at different positions of the reverse side of the front frame of the digital photo frame. Similarly, the second arm 302 has a hollow portion 305 and rotates by the second pivot 304 as the axis, for hanging the digital photo frame on the wall and adjusting the position of the second swing fastener.

Figure 1A:
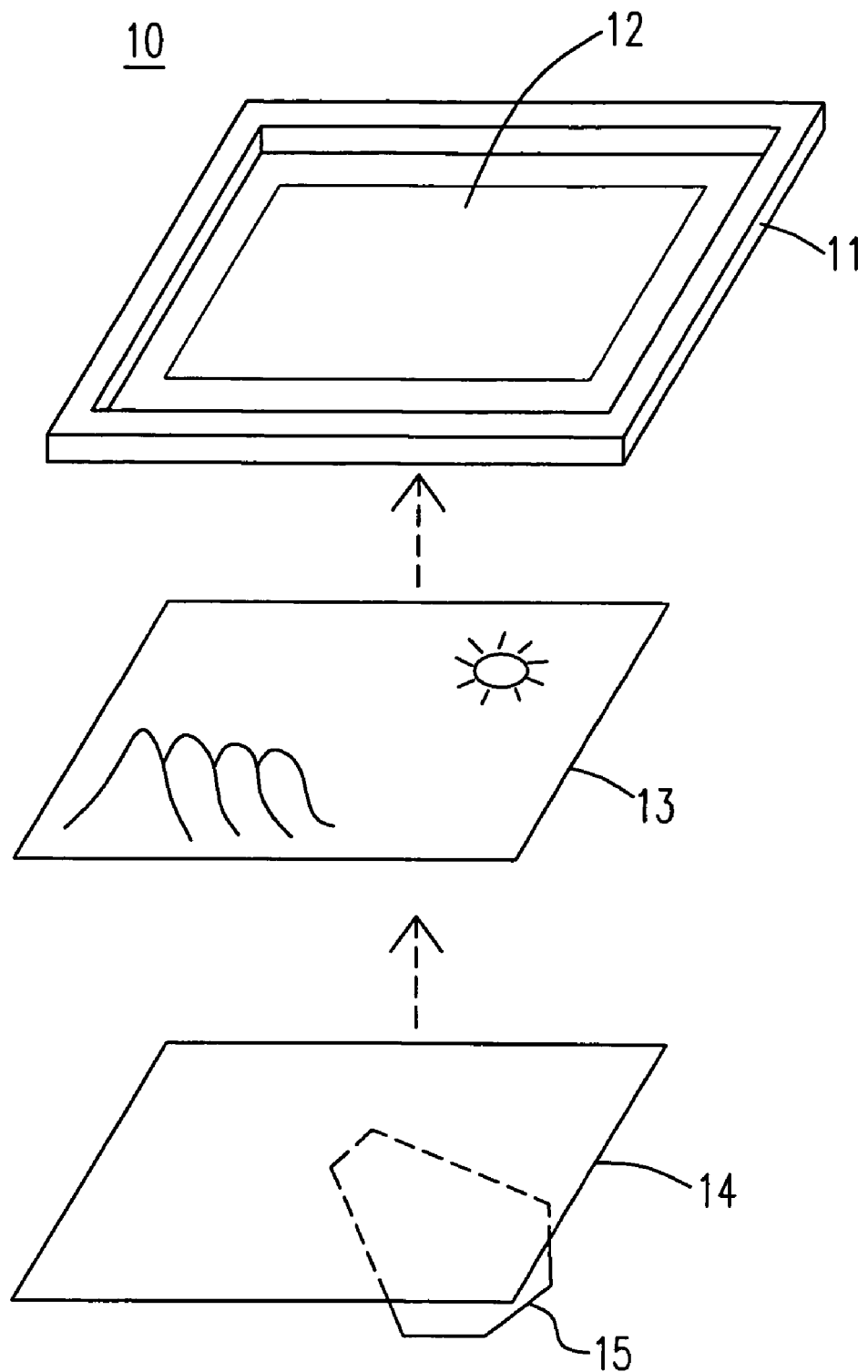
FIGS. 1(A) and 1(B) respectively are a perspective view and a rear view of a traditional photo frame.
Figure 1B:
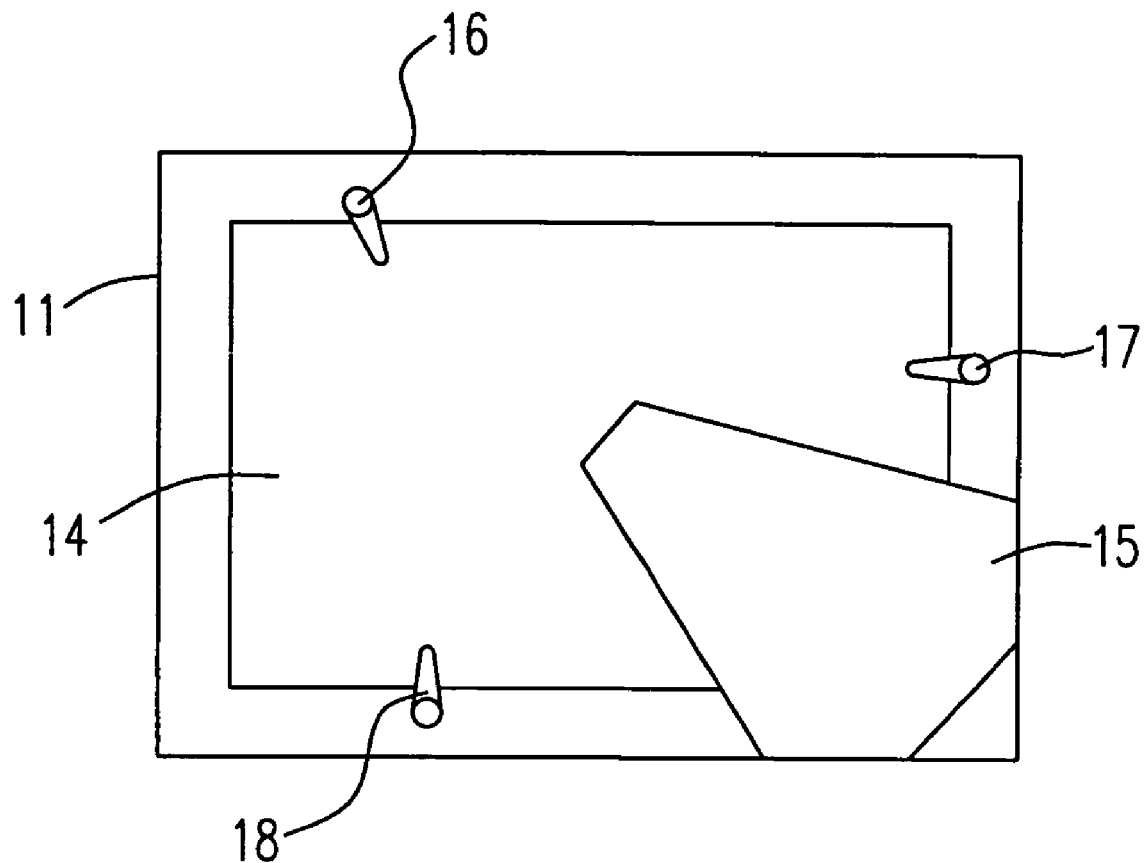

Please refer to FIGS. 2(A) and 2(B), the digital photo frame 20 is completed after the front frame 23 is attached to the display panel 22 and the first arm 261 of the swing fastener 26 is wedged in the display panel 22. Alternatively, the digital photo frame 20 is hanged on the nail or the fixture of the wall by the hollow portion 264 of the second arm 262. When the front frame 23 is replaced, the front frame 23 is separated from the display panel 22. The front frame 23 can be assembled in another size-suitable display panel, and the original display panel 22 also can be fabricated with another size-suitable front frame. Alternatively, as shown in FIG. 1(A), the front frame 23 was fabricated with a photograph and a rear board 221 having a support respectively, and the first arm 261 of the swing fastener 26 of the front frame 23 is wedged in the rear board 221 to accomplish the fabrication of the traditional photo frame. The traditional photo frame can stand on a plane or hang on the hook or the fixture of the wall.

Therefore, the swing fastener of the interchangeable front frame in the digital photo frame is reformed in the present invention, and the user can replace different front frames of the digital photo frame on demand. The replaced front frame also can be fabricated with the rear board 221 of the photo frame to form a new photo frame showing the photos. Furthermore, because of the design of the hollow portion of the second arm of the swing fastener and/or the link, the digital photo frame not only can stand on the table, but also can be hung on the wall or any fixture.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A digital photo frame, comprising:
   a control module;
   a display panel electrically connected to the control module and displaying an image;
   a first front frame having a first surface and a second surface; and
   a plurality of swing fasteners mounted on the second surface, each of which has a pivot, a first arm and a second arm connected to the pivot,
   wherein the first arm pushes against the display panel when the display panel is attached to the front frame, the second arm includes a first part, a second part connected to the pivot and an extendable link connecting the first part and the second part, and the second arm is extended by the extendable link.

2. The digital photo frame according to claim 1, wherein at least one of the swing fasteners has a second arm having a hollow portion thereon and connected to the pivot, and the digital photo frame is hung on a support by the hollow portion.

3. The digital photo frame according to claim 2, wherein the first arm and the second arm form an included angle range between 0 degree and 180 degrees.

4. The digital photo frame according to claim 2, wherein the second arm is used for adjusting a position of the digital photo frame on the support.

5. The digital photo frame according to claim 2, wherein the hollow portion is an aperture.

6. The digital photo frame according to claim 5, wherein the aperture has a semicircular shape.

7. The digital photo frame according to claim 1 further comprising a rear board so as to be pushed by the first arm to hold a photograph between the first surface and the rear board.

8. The digital photo frame according to claim 1, wherein the plurality of swing fasteners are arranged in a triangular shape on the second surface and has a total number of three.

9. The digital photo frame according to claim 1, wherein the plurality of swing fasteners are arranged in a polygonal shape on the second surface and has a total number of more than three.

10. The digital photo frame according to claim 1, wherein the first front frame is made of a ceramic.

11. A digital photo frame having a front frame, a display panel and at least one swing fastener mounted on the front frame, wherein the at least one swing fastener further comprises:
    a first arm pushing against the display panel;
    a second arm having an aperture; and
    a pivot connecting the first arm and the second arm, wherein the digital photo frame is hung on a support by the aperture, the second arm includes a first part, a second part connected to the pivot and an extendable link connecting the first part and the second part, and the second arm is extended by the extendable link.

12. The digital photo frame according to claim 11, wherein the extendable link is a sliding element.

* * * * *